(12) United States Patent
Erb

(10) Patent No.: US 6,456,707 B2
(45) Date of Patent: Sep. 24, 2002

(54) FEATURE IMPLEMENTATION AND PROVISIONING BY INJECTION

(75) Inventor: Paul Erb, Ottawa (CA)

(73) Assignee: Mitel Corporation, Kanata (CA)

( * ) Notice: Subject to any disclaimer, the term of this patent is extended or adjusted under 35 U.S.C. 154(b) by 51 days.

(21) Appl. No.: 09/779,253

(22) Filed: Feb. 7, 2001

(51) Int. Cl.$^7$ .............................................. H04M 3/42
(52) U.S. Cl. ............................ 379/201.03; 379/207.15
(58) Field of Search ....................... 379/201.03, 201.01, 379/201.02, 207.15, 221.09, 67.1

(56) References Cited

U.S. PATENT DOCUMENTS

| | | | | |
|---|---|---|---|---|
| 5,343,517 A | * | 8/1994 | Bogart et al. | 379/207 X |
| 5,404,396 A | * | 4/1995 | Brennan | 379/201 |
| 5,937,048 A | * | 8/1999 | Pelle | 379/201 |
| 6,080,202 A | * | 6/2000 | Strickland et al. | 379/201 |

FOREIGN PATENT DOCUMENTS

EP        0810799 A2    5/1997

* cited by examiner

*Primary Examiner*—Creighton Smith
(74) *Attorney, Agent, or Firm*—Fulwider Patton Lee & Utecht, LLP

(57) ABSTRACT

A system and method of implementing and provisioning features and thereby providing feature services in a call processing environment where features may be introduced, changed or removed from outside the code base. Features are introduced or "injected" into the call processing environment using a feature registry. The feature registry is used to manage feature configuration, behavior and interactions. The code base references the feature registry to apply features during operation. In this manner, features can be implemented by reference without modification or rebuilding of the code base. Features can be added, modified or removed without requiring a system upgrade, even while the code base is in operation. The code base uses a structured framework into which features can be introduced by reference using the feature registry. A feature service manager exclusively controls the feature registry and handles provisioning of features. Feature interaction potential is identified and resolved during feature provisioning. The feature service manager can be configured to enforce feature integrity and behavior rules specific to the call processing product being provisioned.

11 Claims, 2 Drawing Sheets

FEATURE IMPLEMENTATION AND PROVISIONING BY INJECTION

This application claims priority of UK application No. 0002743.3 filed Feb. 7, 2000. That application is incorporated herein by reference.

FIELD OF THE INVENTION

The present invention relates generally to the field of communications and more specifically to a system and method for feature implementation and provisioning in a call processing environment.

BACKGROUND OF THE INVENTION

Early forms of telephony systems of the prior art were mechanically driven using mechanical components. When a telephone call was placed using one of these early forms of telephony systems, few, if any features, were associated or available with the call. With advances in technology, not only the quality and efficiency of prior art systems improved, but also the capability of such systems to provide additional call features was enabled. This was primarily due to the evolution of traditional telephony systems from a mechanical architecture to an electronic architecture. With an electronic architecture, additional call features were facilitated in these prior art systems in hardware, firmware or software, usually under some form of processor or microprocessor based control. Thus the handling of a call, with its associated call features evolved into call processing.

More recent telephony system architectures, including Private Branch Exchanges (PBX), key systems, and telephony servers provide call processing to control and route the call, and provide the call features implemented within a code base embodied in the hardware, firmware, software, or some combination thereof.

Some call features are well known in the art, such as call block, call waiting, three-way calling, however new call features are continually being developed and implemented by telephony system developers and manufacturers.

Introducing new features into a typical prior art call processing environment requires numerous changes distributed throughout the code base. These changes are necessary to address different aspects of the features, such as the user interface, feature validation, feature activation, feature interaction and state specific behaviours.

Interactions between features can be complicated and are often handled specifically in the code base where the feature is implemented. Additional code base changes must be introduced to the code base to manage specific interactions, as required to deal with each possible combination of feature interaction. The code base then becomes the only accurate record of how feature interactions are handled.

Over time, changes to the code base causes the code base to become increasingly destabilized as more and more features are added and modified.

One prior art method of introducing new features into call processing, while limiting changes to the code base, uses feature hooks. This method de-couples the feature implementation and interactions from the code base. The provisioning of features in this prior art method is controlled by binding feature hooks in the code base to the associated feature code or by flags (e.g. Feature-Allowed-Night-Services). However, this prior art method still requires changes to the code base to handle new features (inserting appropriate feature hooks). Interactions between features also require specialized feature hooks or changes to the code base. Making changes to the code base itself requires the telephony system to be shut down, is time consuming, and can be destabilizing if not properly implemented.

A second prior art method uses the Advanced Intelligent Networking (AIN) model. The code base is programmed to signal interested features when an event occurs and allows the features to respond as required. Features that act on the same signal may negotiate as peers or submit to arbitration. In this prior art method feature interactions are handled without requiring changes to the code base. Drawbacks of this model include the performance impact associated with signaling of interested features, and non-deterministic event handling with inconsistent outcomes.

A further prior art method is set forth in Aspect-Oriented Programming by Gregor Kiczales, John Lamping, Anurag Mendhekar, Chris Maeda, Cristina Videira Lopes, Jean-Marc Loingtier and John Irwin in Proceedings of the European Conference on Object-Oriented Programming (ECOOP), Finland, Springer-Verlag LNCS 1241, June 1997, which, at the time of this specification, was available at http://www.parc.xerox.com/cs1/groups/sda/publications/papers/Kiczales-ECOOP97/. An aspect is defined with respect to a system and general purpose language, as a property that must be implemented and "cannot be cleanly encapsulated in a generalized procedure". In Aspect-Oriented programming, each aspect is identified and coded as a separate program. These programs are distinct from regular general-purpose language component programs. A specialized compiler referred to as an "aspect weaver", accepts aspect programs and regular components as input and generates an implementation that integrates them together. This fusion of code results in an executable that is different from the implementation in the sense that when a developer reviews the executable for the purpose of rouble shooting, it is not recognizable from the original program. However, in this method, the ability to maintain the system is compromised and new risks due to the exposure to the new type of compiler are also introduced.

There is a requirement in the art for a stable, efficient and effective system and method of call processing feature implementation and provisioning where features may be introduced, changed or removed without destabilizing the code base.

SUMMARY OF THE INVENTION

The present invention is directed to providing a stable, efficient and effective system and method of implementing and provisioning features and thereby providing feature services in a call processing environment where features may be introduced, changed or removed without destabilizing the code base. In the inventive system and method, features are fully implemented outside the code base. Features are introduced or "injected" into the call processing environment using a feature registry. The feature registry is used to manage feature configuration, behavior and interactions. The code base references the feature registry to apply features during operation. In this manner, features can be implemented by reference without modification or rebuilding of the code base. Features can be added, modified or removed without requiring a system upgrade, even while the code base is in operation. The code base uses a structured framework into which features can be introduced by reference using the feature registry. A feature service manager exclusively controls the feature registry and handles provisioning of features. Feature interaction potential is identified and resolved during feature provisioning. The feature service manager can be configured to enforce feature integrity and behaviour rules specific to the call processing product being provisioned.

Therefore, according to one aspect of the present invention there is provided a system for providing call features in a call processing environment comprising: (a) a code base; (b) a feature registry connected to the code base for describing features; and (c) a feature service manager, coupled to the feature registry for managing the feature registry, wherein the features are introduced for application by code base by reference.

Also, according to another aspect of the present invention there is provided a method for providing call features in a call processing environment comprising the steps of: (a) creating a structured framework for describing call features; (b) instrumenting a code base according to the framework; (c) establishing a feature registry for storing instances of the features corresponding to the framework, separately connected to said code base; and (d) creating a feature service manager, coupled to the feature registry for managing the feature registry, wherein the instances of the features managed by the feature service manager are implemented by the code base by reference to the feature registry.

BRIEF DESCRIPTION OF THE DRAWINGS

An embodiment of the present invention will now be described more fully with reference to the accompanying drawings in which.

DETAILED DESCRIPTION OF A PREFERRED EMBODIMENT

Figure 1:
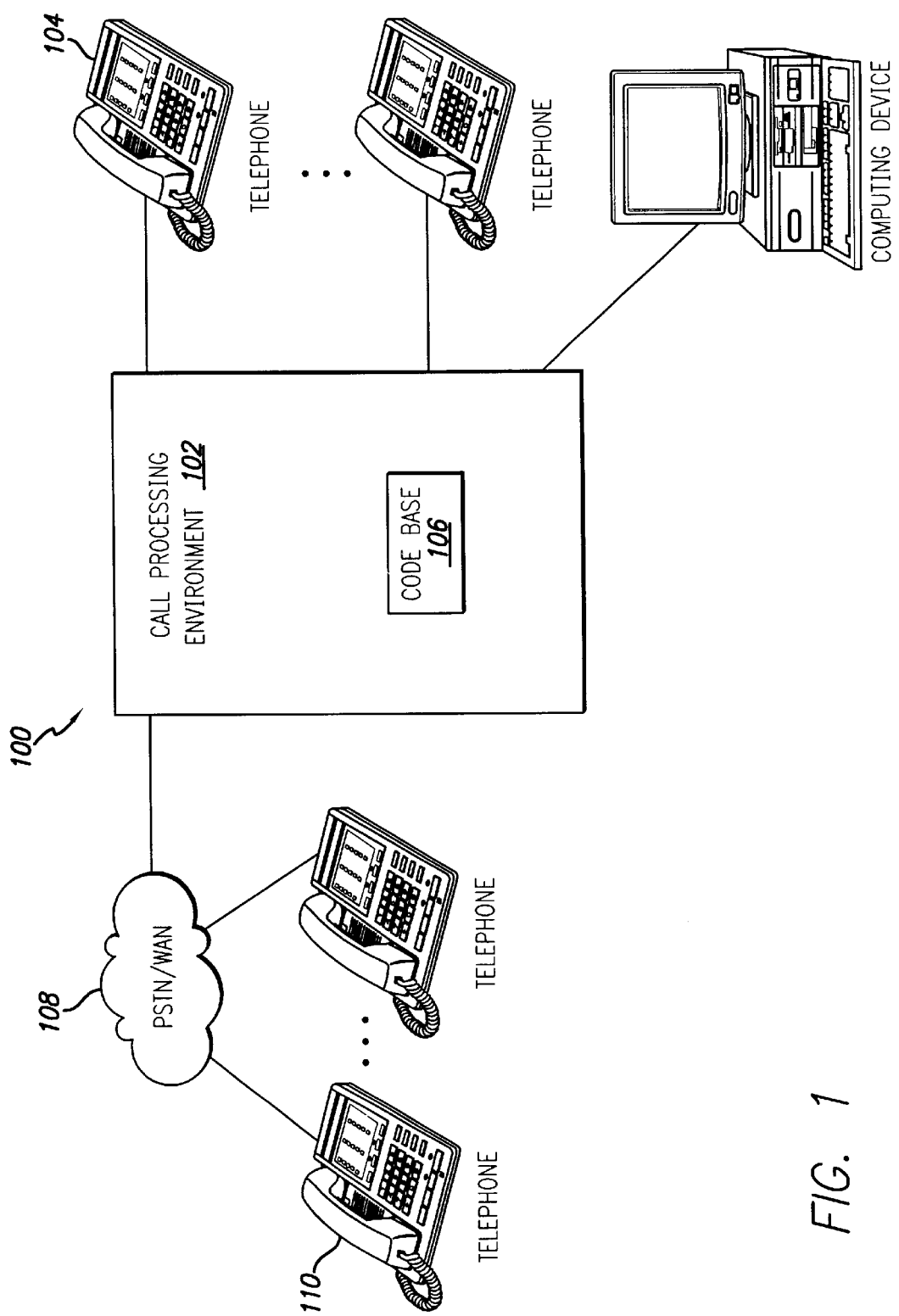
FIG. 1 is a diagrammatic overview of communications system of a call processing environment employing the present invention.

FIG. 1 provides a diagrammatic overview illustrating a preferred embodiment of the present invention within communications system 100. The communications system 100 is broadly defined to allow communications of various forms, including voice, email, fax, etc. between users. Users may be individuals or, alternatively, may be grouped into entities, such as companies, divisions or any such other type of organization, and the communication system 100 includes connections internal and external to the entity or organization. The communications system 100 typically contains a call processing environment 102 for the processing of communications within the entity and call features and feature services are provided within the call processing environment 102. The call processing environment 102 of communications system 100 is typically employed within a business unit, department or optionally may include the entire organization or entity.

The communications system 100 contains numerous devices which can be used to generate, receive, store and communicate messages of various types, which may include voice, email, and facsimile communications. In a preferred embodiment, call processing environment 102 processes communications of various communications devices within the entity. In the most common implementation, communications devices are telephones 104. The communications devices within the entity are not limited to telephones 104, but may include a computing device, printer, fax machine or any communications devices which can send or receive audio, visual, textual, graphical or any other type of information.

In a preferred embodiment, the communication device, such as telephone 104 is a standard analog or digital device with an appropriate user interface as is well known in the art.

Call processing environment 102 includes one or more call processing devices, that either individually or cooperatively, interact with or employ a code base 106 to provide call processing functions. The code base 106 may be software, firmware, hardware, or some combination thereof. In the preferred embodiment, processes running on call processing devices interact with the code base to provide call processing functions. Call processing devices may be one or more of the typical telephony processing devices such as are well known in the art (not shown), including a Private Branch Exchange (PBX), a key system, phone hub, computer, communications server, messaging server, or data stored in a database managed by data management and control process. The code base 106 may be embodied in, or distributed among, one or more of the call processing devices.

Communications system 100 may also include a gateway (not shown) for connecting the call processing environment 102 to the external environment such as a Public Switched Telephone Network or Wide Area Network (PSTN/WAN) 108. The gateway facilitates communications with the outside world, and may include connections to the Internet. Through the PSTN/WAN 108, users external to the entity, using communications devices such as telephones 110 can communicate with users through call processing environment 102.

The communications devices and call processing devices of call processing environment 102 may be interconnected by a Local Area Network (not shown).

The call processing environment 102 is used to route calls and provide features and feature services utilizing the code base 106. Calls may be internal to the organization, or may originate or terminate remotely. The functions of the call processing devices may be performed by separate devices, or one or more of their functions may be integrated or combined into a single device.

Figure 2:
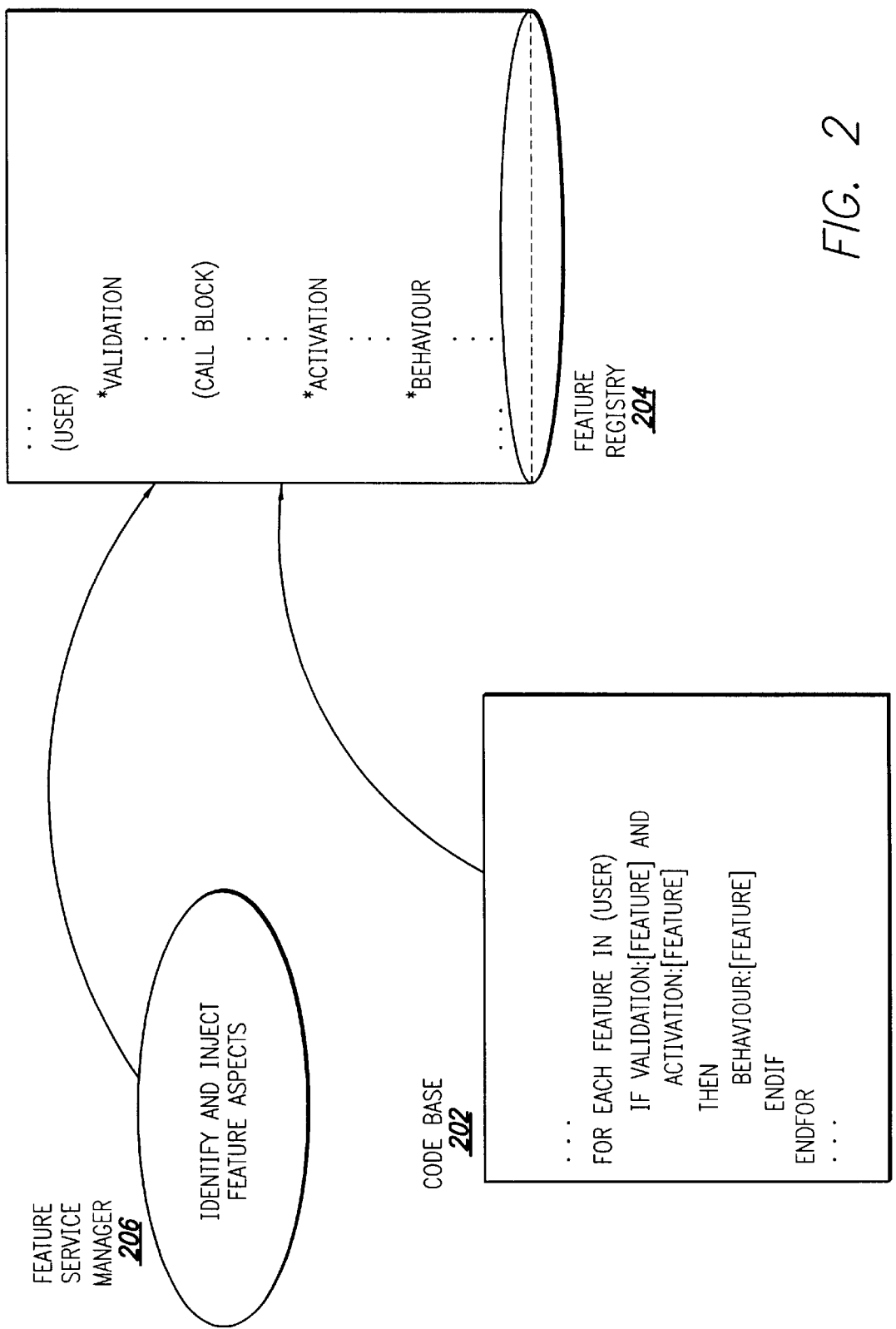
FIG. 2 is a diagrammatic representation of components within the call processing environment of FIG. 1.

Turning to FIG. 2, a preferred embodiment of a call processing environment of FIG. 1 is shown in further detail. FIG. 2 illustrates how features are provisioned in the call processing environment 200.

Call processing in call processing environment 200 is under general management and control of code base 202. Code base 202 may be embodied in hardware, firmware or software of a call processing device as previously described with respect to FIG. 1. Features supported by the code base 202 are fully implemented separately from the code base 202. This architecture enables feature implementation to be performed independent of the code base as well as externally, if desired. An important characteristic of the code base 202 is that features are supported by the code base 202 by reference without any modification to the code base 202. The code base 202 is instrumented with a contractual interface specification or framework into which aspects of a feature can be introduced. The code base 202 works with the framework to reference feature aspects using a feature registry 204.

Using the aforenoted framework, the code base 202 consults the feature registry 204 to implement a feature. In this manner, features may be added, modified, and deleted without requiring a system upgrade and without jeopardizing the code base 202 itself. Features can be added, modified or removed while the code base 202 is in operation without the need to have the code base 202 taken down, modified, or rebuilt. This results in feature implementation that is fast and robust. The framework can be enhanced over time to support additional feature aspects (e.g. a versioning mechanism can be applied).

Features are generically described and structured in the framework in terms of feature aspects. These feature aspects are components of the framework into which a feature can be partitioned. Feature aspects are implemented separately conforming to the requirements of the framework. The framework also dictates how these aspects are applied by the code base 202 during operation, and feature aspects can also be qualified by the "system state" in which they apply. Not all aspects need to be present in a feature.

The syntax of feature aspect and code base implementation is dependent on the programming language and interface of the code base 202. Any appropriate programming language such as is well known in the art may be used. In a preferred embodiment, the feature aspect implementation and code base is programmed in the C++ programming language using Common Object Model (COM) programming. Program code may be stored in the feature registry 204 in macro, programming language or executable form.

The feature registry 204 is used to manage feature configuration, behavior and feature interactions. The feature registry 204 reflects the interface requirements of the framework. When a feature aspect is placed in the feature registry 204, it becomes immediately available to the code base 202. The code base 202 references the feature registry 204 to apply features during operation. All of the information, instructions and data necessary for the feature aspect is stored in the feature registry 204. Features are introduced into the call processing environment 200 by injection into the feature registry 204.

The feature registry 204 may be populated by any mechanism, whether static or dynamic (not only a feature service manager 206 such as discussed in greater detail below). Advanced data management techniques can also be applied to the feature registry 204 to improve system performance (e.g. statistical optimizations or data caching).

Feature service manager 206 exclusively controls the feature registry 204 and handles provisioning of features. The feature service manager 206 "injects" feature aspects by populating the feature registry 204. Feature interaction conflict is identified and potentially resolved during feature provisioning by the feature service manager 206. The feature service manager 206 is configured to enforce feature integrity and behavioral rules specific to the product feature being provisioned.

The feature registry 204 and feature service manager 206 may be implemented as a process and associated database on a call processing device within the call processing environment 200.

The operation of the framework and utilization of feature aspects is further illustrated by way of example. For the purposes of this example, feature aspects could include, but are not limited to:
Configuration
User interface
Validation criteria
Activation criteria
Behaviour
Exception handling In this example, configuration is the feature aspect of the framework that relates to how to set up a particular feature. User interface is the feature aspect that relates to the actions and activities on the user interface of a communications device necessary for a user to activate, manage and deactivate a feature. Validation criteria is the feature aspect that represents the criteria which are evaluated to determine if the feature applies. Activation criteria is the feature aspect that represents the criteria which are evaluated to determine if the feature behavior should be activated. Behavior is the feature aspect that represents the action performed when the activation criteria are met. Exception handling is the feature aspect representing the activity that is performed when an exception occurs.

During operation, the code base 202 accesses the feature registry 204 to determine the valid features at each system state transition. Features are configured in categories, such as User, Device Type, etc. Upon instantiation of an item in a specific category, for example, a new User, all configuration aspects in the category of the feature registry 204 are applied. Subsequently, if a feature is valid on state transition, the activation aspect is applied. In turn, if the feature is active, the behaviour aspect is applied. Additional aspects may be conditionally applied in sequence according to the framework implemented in the code base 202.

For further illustration a Call Block feature is set forth below, The feature aspects of a Call Block feature include:

| | |
|---|---|
| Configuration: | For each User |
| | Call Block List of Caller Identities |
| | maximum Number of Blocked Callers = 20 |
| User interface: | Enable/Disable Call Block |
| | (code:<Adds/Removes Caller Identity from Call Block List>) |
| Validation: | User state is Call Presented |
| Activation: | Caller identity is in Call Block List |
| Behaviour: | Reject Caller |

In this example, the code associated with configuration for the Call Block feature is implemented in C++ by a CALL-BLOCK::Configuration::Configure-User() member function. This function implements the allocation and initialization of a Call Block List with twenty entries. The Call Block List is also associated with a user (in context) of the User category.

The feature service manager 206 uses the feature implementation described above to identify that a configuration aspect of the feature is associated with a particular User configuration. This is accomplished through the naming convention by associating a numeric or alphanumeric name for each user. A C++ function reference to invoke the member function CALL BLOCK::Configuration::Configure-User() is added to the list of configuration function references in the User subsection of the feature registry 204. For example, this entry in the feature registry might be in any position in the list and is referenced as FEATURE-REGISTRY::USER::Configuration::Entry[CALL-BLOCK=40](). All other aspects are added to the feature registry similarly.

In this example, when the user state is Call Presented the validation aspect of CALL-BLOCK is true. The activation aspect of CALL-BLOCK is applied which checks if the Caller Identity (in context) is in the Call Block List. If the activation aspect of CALL-BLOCK is also true the behaviour is applied and the call is rejected.

For further illustration, this may be implemented in pseudocode as shown below:
<User state changed to Call Presented>
FOR EACH FEATURE IN feature registry DO
  IF FEATURE-REGISTRY::USER::Validation::Entry [FEATURE] AND

```
FEATURE-REGISTRY::USER::Activation::Entry
    [FEATURE] THEN
    FEATURE-REGISTRY::USER::Behaviour::Entry
        [FEATURE]
ENDIF
ENDFOR
```

The code base 202 applies successive entries in the feature registry 204 as defined by the framework. A single category of the feature registry 204 applies to each category of system state change. These categories reflect an Object Oriented design of the code base.

In alternate embodiments (not shown), feature aspects may also include non-programming but related specifications, such as:

Definition
Usage
Examples
Terms
Troubleshooting suggestions

These related specifications are useful for feature development and support activities such as the generation of accompanying documentation. Injection of these feature aspects into the call processing environment also simplifies and improves the maintainability of the software system.

The present invention may also be adapted for use in other software systems. In particular, the feature service manager and feature registry may be used to introduce features into any stable code base in any software system, including software systems outside of the context of a call processing environment, such as a personal computer system, mainframe computer system, embedded controller or such other software, firmware or hardware based system.

Although the invention has been described in terms of the preferred and several alternate embodiments described herein, those skilled in the art will appreciate other embodiments and modifications which can be made without departing from the sphere and scope of the teachings of the invention. All such modifications are intended to be included within the scope of the claims appended hereto.

What is claimed is:

1. A system for providing call features in a call processing environment comprising:

(a) a code base;
   (b) a feature registry connected to said code base for describing features; and
   (c) a feature service manager coupled to said feature registry for managing said feature registry, wherein said features are introduced for application by said code base by reference.

2. The system of claim 1 wherein said features are introduced by injection.

3. The system of claim 1 wherein said features are described as feature aspects.

4. The system of claim 3 wherein said feature aspects are organized into a framework.

5. The system of claim 1 wherein said feature service manager and said feature registry are external to said code base.

6. The system of claim 1 wherein said features are provisioned while said code base is running.

7. A method for providing call features in a call processing environment comprising the steps of:

(a) creating a structured framework for describing call features;
   (b) instrumenting a code base according to said framework;
   (c) establishing a feature registry for storing instances of said features corresponding to said framework, separately connected to said code base; and
   (d) creating a feature service manager, coupled to said feature registry for managing said feature registry, wherein said instances of said features managed by said feature service manager are implemented by said code base by reference to said feature registry.

8. The method of claim 7 wherein said features are introduced to said feature registry by injection.

9. The method of claim 7 wherein said features of said framework are described as feature aspects.

10. The method of claim 7 wherein said feature service manager and said feature registry are external to said code base.

11. The method of claim 7 wherein said features are injected into said feature registry by said feature service manager while said code base is running.

* * * * *

UNITED STATES PATENT AND TRADEMARK OFFICE
CERTIFICATE OF CORRECTION

PATENT NO. : 6,456,707 B2
DATED : September 24, 2002
INVENTOR(S) : Paul Erb

It is certified that error appears in the above-identified patent and that said Letters Patent is hereby corrected as shown below:

<u>Title page,</u>
Before References Cited, add the following:
-- Foreign Application Priority Data
Feb. 7, 2000    (CA) ............ 0002743.3 --.

Signed and Sealed this

Twenty-fourth Day of December, 2002

JAMES E. ROGAN
*Director of the United States Patent and Trademark Office*